United States Patent [19]

Stewart et al.

[11] Patent Number: 5,283,671
[45] Date of Patent: Feb. 1, 1994

[54] METHOD AND APPARATUS FOR CONVERTING RGB DIGITAL DATA TO OPTIMIZED CMYK DIGITAL DATA

[76] Inventors: John R. Stewart, 1/80 Woodland St., Balgowlah Heights; Andrew Cunningham, 66 Whale Beach Rd., Avalone; David Alexander, 19 NeDean Ave, Normanhurst, all of Australia; Bradley A. Silen, 8 Buckeye Way, Kentfield, Calif. 94904; Charlie Fenton, 141 Winfield St., San Francisco, both of Calif. 94110

[21] Appl. No.: 658,188

[22] Filed: Feb. 20, 1991

[51] Int. Cl.⁵ .......................................... H04N 1/46
[52] U.S. Cl. .................................. 358/532; 358/534
[58] Field of Search .............. 358/76, 80, 22, 21 R, 358/75, 78; H04N 1/46

[56] References Cited

U.S. PATENT DOCUMENTS

| | | | |
|---|---|---|---|
| 4,811,239 | 3/1989 | Tsao | 358/75 |
| 4,970,584 | 11/1990 | Sato et al. | 358/75 |
| 5,049,985 | 9/1991 | Outa | 358/76 |
| 5,053,866 | 10/1991 | Johnson | 358/75 |
| 5,060,061 | 10/1991 | Shishido et al. | 358/76 |
| 5,081,529 | 1/1992 | Collette | 358/76 |
| 5,121,198 | 6/1992 | Maronian | 358/76 |

FOREIGN PATENT DOCUMENTS 258673 9/1988 European Pat. Off. .

Primary Examiner—Stephen Brinich
Attorney, Agent, or Firm—Flehr, Hohbach, Test, Albritton & Herbert

[57] ABSTRACT

A printing system is disclosed. The system includes a scanner which produces an RGB signal corresponding to a scanned image. The RGB signal is compressed in accordance with a tone curve which is built in reliance upon input provided by the user. The resultant compressed RGB signal is conveyed to a computer. The RGB signal may be modified by a number of interface controls. The RGB signal is driven through a separation engine to produce individual CMYK signals. The separation engine relies upon the interface controls in converting the signal. Image sharpening, or unsharp masking, is performed on resultant CMYK signals to produce a sharp printed image. The image sharpening procedure includes sharpening pixels, calculating T-sums for pixels, calculating gradients for pixels, and smoothing pixels in response to the T-sums and gradient calculations. The resultant CMYK signals may be exported for further data processing, such as integration with text, or they may be sent to a printer to produce high-quality prints.

15 Claims, 13 Drawing Sheets

METHOD AND APPARATUS FOR CONVERTING RGB DIGITAL DATA TO OPTIMIZED CMYK DIGITAL DATA

BRIEF DESCRIPTION OF THE INVENTION

This invention relates generally to the reproduction of colored film into digital data which may be used by a four color printer. More particularly, this invention relates to a method and apparatus for converting RGB scanned images into optimal CMYK digital output suitable for high-quality color printing.

BACKGROUND OF THE INVENTION

Film projectors, televisions, and computer monitors utilize an additive color model where the individual colors (Red, Green, and Blue—RGB) may be presumed pure, and therefore may be combined to produce high-quality colors in a relatively predictable manner. In contrast, color printing utilizes the concept of subtractive color in which three inks combined in different amounts absorb different amounts of the RGB colors. These inks, known as CMYK, are cyan (which absorbs red light), magenta (which absorbs green light) and yellow (which absorbs blue light). Black ink is also used to shadow areas to increase contrast and make up for deficiencies in the inks themselves. Unlike, the relatively pure RGB colors which are projected in light, CMYK color production must accommodate for ink impurities. Ink impurities prevent a direct transition from a RGB to a CMYK model. Thus, it is difficult to accurately represent on an additive color device, the effect that corrections will have on a subtractive image.

Traditionally, drum scanners have been employed to convert film into data for high quality prints suitable for use in magazines, books, brochures, and other printed material. Film is placed on the drum scanner and then treated with an oil-based composition. The drum scanner is then rotated and an optical assembly separately analyzes with photo multipliers the rotating film through red, green, and blue filters to produce CMYK color plates.

Recently, flat-bed electronic scanners utilizing charge coupled devices, or CCDs, have been employed to scan film to produce digital data which may be further processed by a host computer. Specifically, a scanner scans film through a red, a green, and then a blue filter. Red, green, and blue data of the photograph are thereby produced. Afterwards, the individual data files are interleaved by the scanner to produce a single file with a composite red, green, and blue (RGB) digital data image. This combined RGB data is then conveyed to a host computer which may project the RGB data onto a monitor. The user may make adjusts to the RGB data while viewing it on the monitor. After adjustments, the host computer converts the RGB data to individual cyan, magenta, yellow, and black (CMYK) data files. These individual data files may then be prepared for the printing press by creating separate plates from the image of the film.

This approach is advantageous since it reduces the need for intermediate photographic films and manual image assembly. The approach is also advantageous since the photographic original is scanned directly, without having to apply any materials to the photograph, as is done in drum scan technology. In addition, this approach produces digital data which may be conveniently utilized for further processing and incorporation with text.

On the other hand, this approach has not been able to produce the quality reproductions which are realized with drum scanners. One problem relates to the necessity of compressing the tonal range when one moves from film to a printed image. A transparency has a large density range, while a printing press has an extremely limited range. Consequently, tonal compression is necessary when moving from a transparency to a printed image. If tone is not compressed properly, the resultant image will lose important tonal detail or have unnatural tone shifts.

It is difficult to determine where to compress an image. Typically, RGB scanners utilize a simple compression of the overall tonal range in accordance with a gamma curve. This approach does not allow for the optimum data to be captured for specific reproduction requirements and different original images. For instance, one image might depend on accurate rendition of the shadow, with greater compromise possible in reproducing the highlights, while another image might be completely the opposite, where the highlights are more important to the picture.

Another problem with digital systems is treating color casts. An original image will often have a color cast, usually most notable in a particular area such as a highlight. These casts should be removed for successful reproduction.

Another problem with prior art printing systems relates to black generation. Black is added to achieve detail and contrast in shadow areas. Black adds the density that is lost due to additivity failure when the inks are printed on top of each other. Prior art systems are limited to black generation by skeleton black or to default black generation methods utilizing only under color removal or gray component replacement.

The problem associated with gray component replacement is that it produces an undesirable color shift. In addition, it is difficult to decide how much color to remove and how much black to replace it with.

A problem associated with all reproduction processes is the lack of sharpness in the original image. If smooth areas of a figure are erroneously adjusted for sharpness, then the texture of the area is augmented and becomes unnatural. In most image manipulation programs, sharpening, or unsharp masking, is done with filters based on a convolution matrix, by analyzing a pixel and its immediate neighbors. Because digitally scanned data is often quite coarse, single pixels can be distinctly different from their neighbors, and these filters can adversely affect smooth tones in an image. To smooth flat areas, one must distinguish between an artifact of scanned data and an actual edge. In an ideal system, one would be able to determine which areas should be smoothed, and which edges should be sharpened and by how much. Moreover, it would be highly advantageous to be able to control the adjustment of the sharpening threshold, the amount of sharpening applied, the amount of contrast at the edges, and the addition of tonal smoothness.

OBJECTS AND SUMMARY OF THE INVENTION

It is a general object of the present invention to provide a printing system with enhanced color separation.

It is another general object of the present invention to provide a printing system which produces color prints with a comparable quality to that obtained by traditional drum scanners.

It is another object of the present invention to realize optimal tonal compression of scanned data for specific printing processes.

It is yet another object of the present invention to provide a method and apparatus which allows for natural sharpening of chosen features in a printed image.

It is another object of the present invention to provide a method and apparatus controlled by a plurality of user interface options for converting RGB data to CMYK data.

These and other objects are obtained by a printing press system in accordance with the present invention. The system includes a scanner which produces an RGB signal corresponding to a scanned image. The RGB signal is compressed in accordance with a tone curve which is built in reliance upon input provided by the user. The resultant compressed RGB signal is conveyed to a computer. The RGB signal may be modified by a number of interface controls. The RGB signal is driven through a separation engine to produce individual CMYK signals. The separation engine relies upon the interface controls in converting the signal. Image sharpening, or unsharp masking, is performed on resultant CMYK signals to produce a sharp printed image. The image sharpening procedure includes sharpening pixels, calculating T-sums for pixels, calculating gradients for pixels, and smoothing pixels in response to the T-sums and gradient calculations. The resultant CMYK signals may be exported for further data processing, such as integration with text, or they may be sent to a printer to produce high-quality prints.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figure 1:
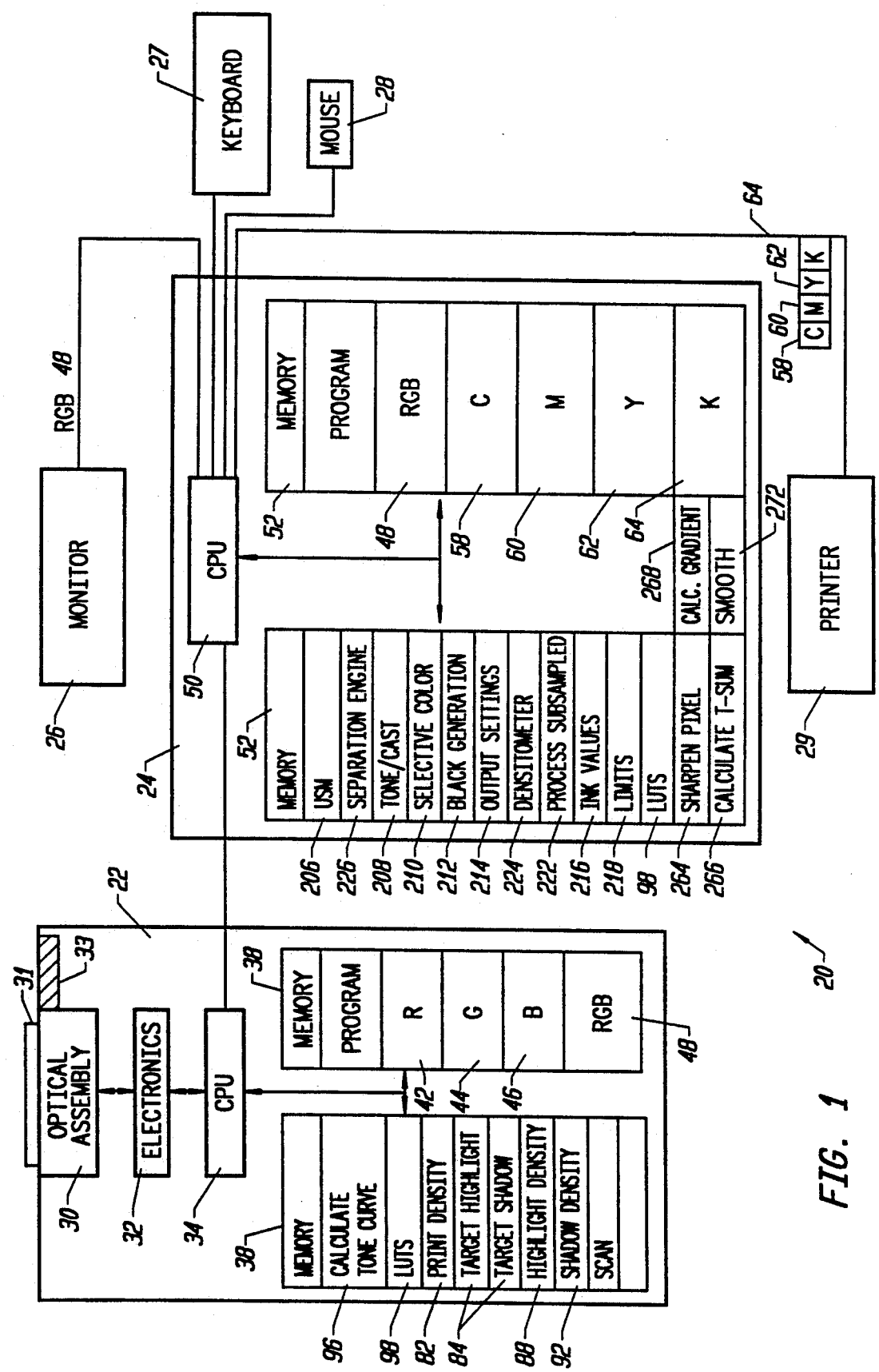
FIG. 1 is a block diagram of a printing press system which may be used in accordance with the present invention.

Turning now to the drawings, wherein like components are designated by like reference numerals in the various figures, attention is initially directed to FIG. 1. FIG. 1 depicts a printing press system 20 which may be used in accordance with the present invention. The system 20 includes a scanner 22 coupled to a computer 24. The computer is coupled to a number of peripheral devices: a monitor 26, a keyboard 27, a mouse 28, and a printer 29.

By way of general overview, the system operates in the following manner. Scanner 22 includes optical assembly 30 which receives an image from a photographic negative 31. More specifically, optical assembly 30 scans the photographic negative 31 using a red, a green, and then a blue filter; the filters are loaded by a filter assembly 33. As a result, the red signal 42, green signal 44, and blue signal 46 are produced.

The electronics 32 include a digital signal processor which converts the analog signals from the optical assembly 30 to digital signals which are relayed to the scanner CPU 34. The scanner CPU 34 works in conjunction with scanner memory 38. As used herein, scanner memory 38 includes dynamic memory and mass storage devices, such as hard disk drives. The scanner memory 38 stores a plurality of programs, including calculate tone curves, and LUTS, as to be described herein.

After each, signal has been stored in scanner memory 38, the scanner 22 CPU 34 begins to interleave the signals into a single RGB signal 48, including proportional red, green, and blue signals. Thus, the scanned image is represented by a signal with red, green, and blue elements. This signal may be partitioned into individual pixels.

The resultant RGB signal 48 is conveyed to computer 24, preferably a computer manufactured by Apple, Inc., Cupertino, California. Computer 24 includes a computer CPU 50 which is coupled to computer memory 52. Computer memory 52 includes a program region which stores a number of programs to be more fully described herein. Computer memory 52 also includes a memory region for the RGB signal 48 from scanner 22. As used herein, memory region interchangeably includes RAM, hard disk, or optical storage devices. The RGB signal 48 may be conveyed to monitor 26 where it can be projected in accordance with known RGB projection techniques. An individual may view the image on the monitor 26 and make certain modifications to the image through keyboard 27 and/or mouse 29. After modifications have been accomplished, in accordance with the method and apparatus of the present invention, the RGB data is transformed into a cyan signal 58, a magenta signal 60, a yellow signal 62, and a black signal 64. More particularly, the modifications accumulated through the interaction with the keyboard 27 and/or mouse 28 are used to modify a separation engine which receives each pixel of data and transforms it from an RGB signal to a CMYK signal. These signals may then be conveyed to a printer 28 which utilizes them to form a color print.

Having provided a general overview of the method and apparatus of the present invention, attention presently focuses on the individual aspects of the invention. The prepress methodology is disclosed in relation to FIG. 2. The scanner is capable of accumulating twelve bits of data for each color channel, for each pixel. This data must be compressed to eight bits per channel for use in relation to the monitor 26. Proper compression of this data is necessary to preserve the dynamic range of the image. The transparency being scanned may have a brightness difference between the lightest highlight and darkest shadow of 3000:1. This difference is compressed to the 80:1 ratio necessary for the ink, paper, and press limitations of printing. A linear compression will reduce the dynamic range of the image. An optimal compression may be obtained by the method disclosed in relation to FIG. 3 and 4.

Prior to mounting the transparency, preferably, some characteristics are evaluated and categorized. Both the highlight and shadow areas of interest should be evaluated in terms of visual density. Consideration is then made as to whether either point needs lightening, darkening, or other special consideration. The neutral areas of the picture should also be identified and evaluated for color casts.

Figure 2:
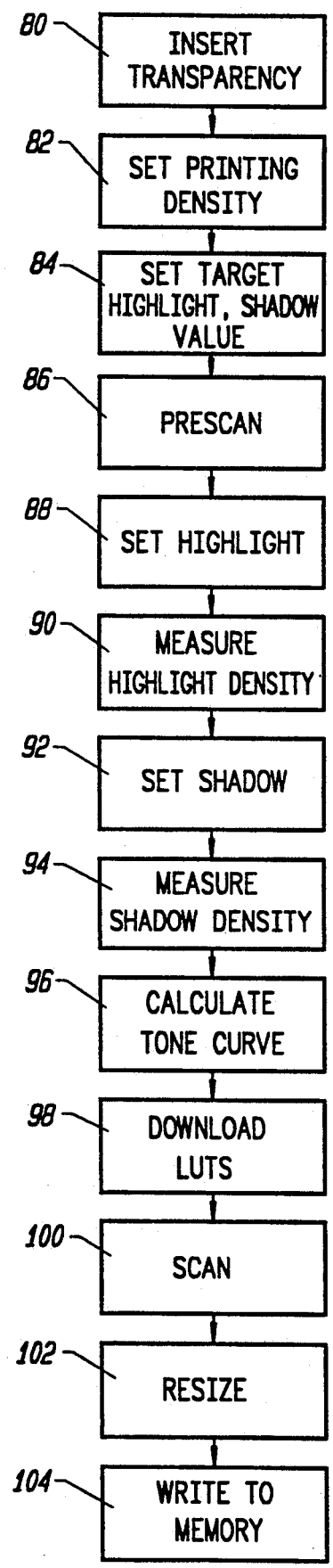
FIG. 2 is a flow chart describing the operation of a scanner in accordance with the present invention.
Figure 3:
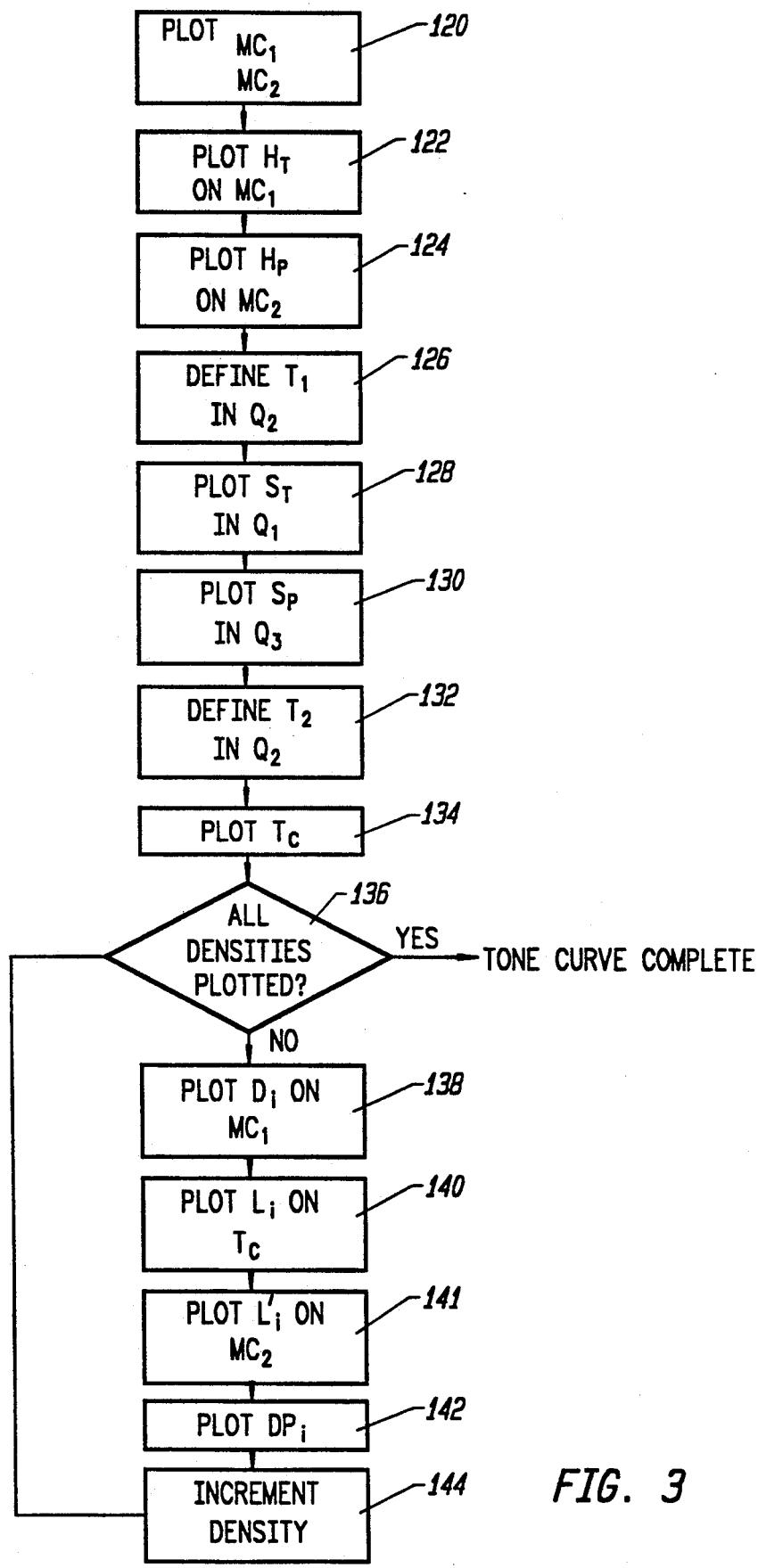
FIG. 3 is a flow chart describing the tone curve calculation utilized by a scanner in accordance with the present invention.

Turning to FIG. 2, after the preliminary analysis of the transparency 31, it is inserted into scanner 22 (block 80). The available printing density, an empirical number, is then entered through the keyboard 27 and relayed to the scanner 22 (block 82).

In an analogous manner, a highlight target dot percent printing value (typically about 5%) and a target shadow dot percent printing value (typically about 97%) is relayed to the scanner 22 (block 84). Thus, if a 5% target point value is selected by the user, the exposure will be set to obtain this target dot value.

A prescan is then initiated, without a color filter (block 86). The image from the film 31 is projected on monitor 26, in accordance with prior art techniques.

The user then, interactively with the mouse 28 or keyboard 27, selects the highlight point in the image (block 88) by viewing it on monitor 26. Selection of this highlight point may be assisted through a max-value methodology. In such a scheme, any point on the screen, as indicated by the mouse 29, is compared by CPU 34 to all other values on the monitor 26 in relation to relative highlight values. That is, each pixel's brightness or highlight value, as defined by its numerical value, is compared to all other pixel values. If other points on the monitor have greater brightness values, those points may be highlighted on the monitor, for instance by assigning them a red color, to indicate this fact. The user may then move to the highlighted points until no other highlights are present, thereby indicating that no other points have a greater brightness value. In accordance with color reproduction theory, ideally the brightest neutral area on the image in which there is a desire to retain some detail is selected. The process is interactive, therefore, the individual may chose a highlight without it actually being the de facto highlight in the image. Indeed, the highlight may be evaluated by the user prior to scanning, as previously discussed. However, this method allows an individual to make a more informed decision on what actually represents a highlight. In any event, once the highlight point is selected, the highlight density of the transparency at that point is measured and stored (block 90).

An analogous methodology is followed in relation to the shadow area of the transparency. Specifically, the shadow point is selected (block 92) and the transparency density is measured at that shadow point (block 94). The set highlight (block 88) and set shadow (block 92) steps are an emulation of the technique used on drum scanners. By setting the highlight and shadow value at scan time, it is possible to direct the scanner to use an exposure that applies the tone curves from the selected highlight point down to the shadow point.

The tone curve of the present invention is calculated (block 96) by using the data accumulated: printing density (block 82), highlight dot percentage, shadow dot percentage (block 84), highlight density (block 90), and shadow density (block 94). More particularly, the calculation of the tone curve in accordance with the present invention is disclosed in relation to FIG. 3.

Figure 4:
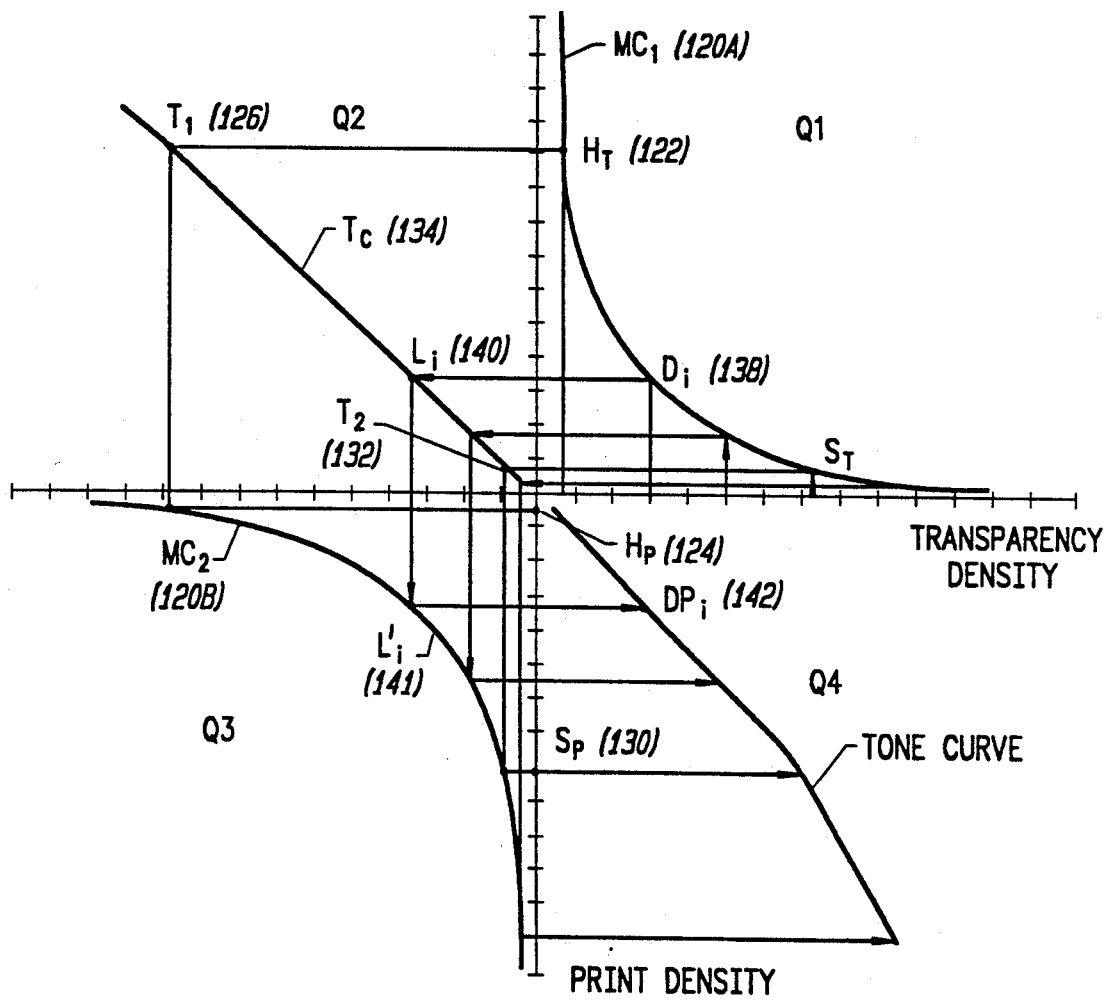
FIG. 4 is a diagram illustrating the calculation of the tone curve, as described in FIG. 3.

Initially, two Munsell curves $MC_1$ and $MC_2$ are plotted (block 120), in accordance with the prior art. As seen in FIG. 4, these curves (120A and 120B) are mirror images of one another in quadrants Q1 and Q3. Plotting the highlight value of the transparency, on the transparency density axis, $H_T$ is associated with the analogous value on $MC_1$ (block 122). The highlight dot percentage $H_P$ is plotted on the print density axis and is associated with the analogous value on $MC_2$ (block 124). $T_1$ is then defined at the intersection of the $H_T$ and $H_P$ values through the respective Munsell curves (block 128).

In an analogous manner the shadow value of the transparency $S_T$ is associated with the analogous value on $MC_1$ (block 128). The shadow dot percentage $S_P$ is associated with the analogous value on $MC_2$ (block 130). $T_2$ is then defined at the intersection of the $S_T$ and $S_P$ values through the respective Munsell curves (block 132). Transfer curve $T_C$ is then plotted as a line between $T_1$ and $T_2$ (block 134).

The tone curve is then constructed by considering incremental transparency densities $D_i$ such that $H_T < = D_i < = S_T$. Initially, $D_i$ is plotted as a luminosity value on $MC_1$ (block 138). This value is then plotted on transfer curve $T_C$ as $L_i$ (block 140). $L_i$ is then plotted on $MC_2$. Finally $DP_i$ is plotted on the tone curve in Q4 relying upon the $L_i$ and $D_i$ values. Additional points are built on the tone curve by incrementing the density block (144) and repeating the procedure until all densities are plotted (decision block 136).

Thus, by calculating the tone curve in accordance with the present invention, the controls known on drum scanners are reproduced in a digital environment. That is, optimal tone transfer from 12 bits per channel to 8 bits per channel may be obtained by using the foregoing method in accordance with the invention.

Preferably, the resultant tone curve is downloaded by CPU 34 into memory 38 as a look-up table (LUT) (block 98). Subsequently, the transparency 31 is scanned (block 100). By relying upon the look-up tables, the 12 bit data from the scanner is converted to 8 bit data. That is, the individual transparency densities may be fitted on the tone curve for a proper print density in the final printed image. In a preferable embodiment, the image may be resized (block 102), in accordance with prior art techniques. The scanned and adjusted data is then stored (block 104).

The steps in relation to the original tonal compression of the image from the high density range of the transparency, to 12 bit data, to 8 bit data for each color channel for each pixel has been disclosed. Subsequent discussion relates to the interactive environment produced on the computer 24, through monitor 26, and the interactive adjustments a user may make before separating the image.

Figure 5:
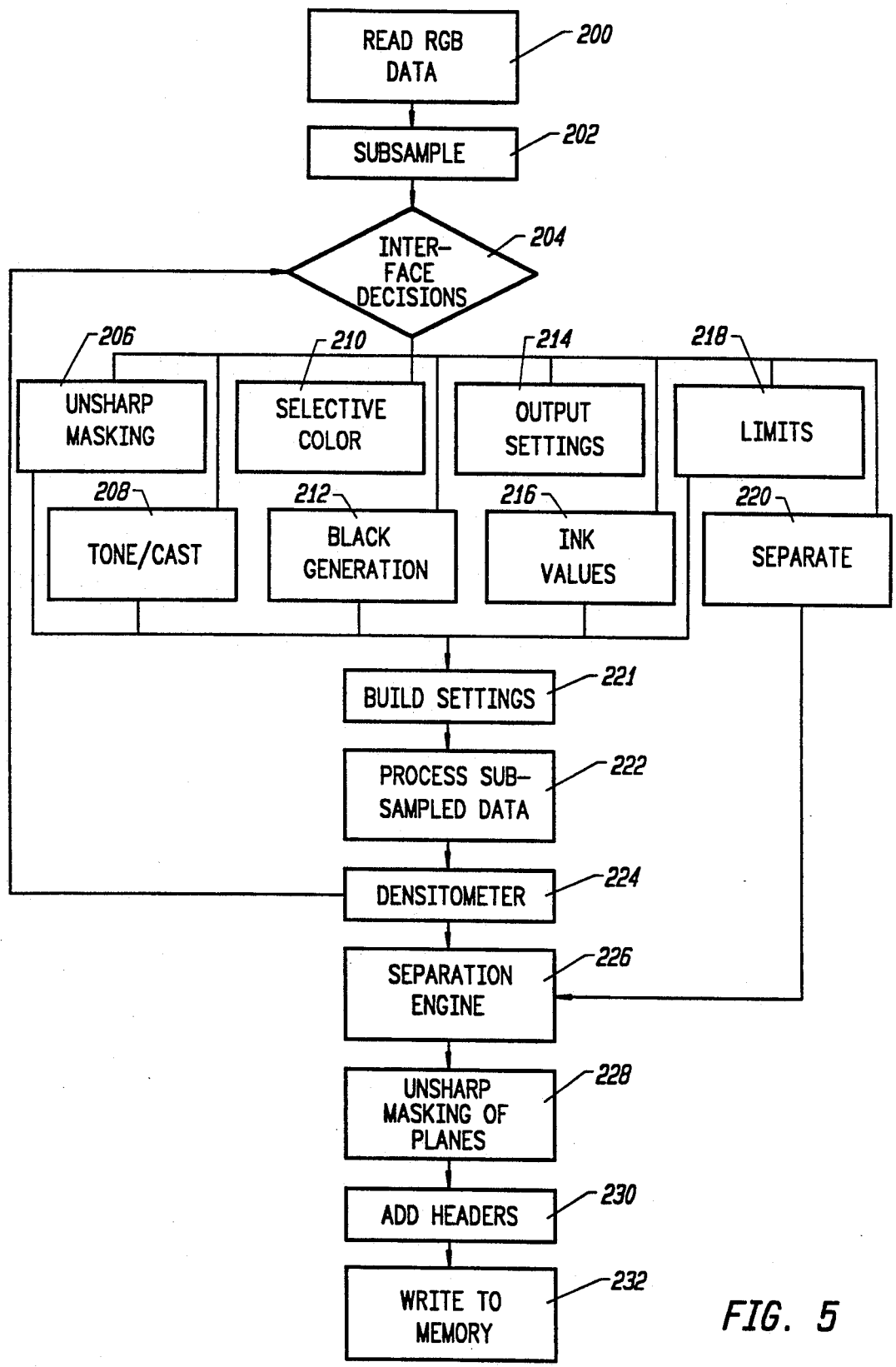
FIG. 5 is a block diagram of the interface options associated with a printing press system in accordance with the present invention.

Turning to FIG. 5, a flow chart of possible data corrections is disclosed. Any combination of these corrections may be made to obtain optimal data. The detail enhancement, or unsharp masking, feature of the present invention is most beneficial when combined with these corrections, which are known in the art.

Initially, the high resolution data previously transferred from the scanner 22 and stored in computer memory 52, is read from memory (block 200). Since processing full resolution data in real time would be difficult, preferably, the user determines a subsampling rate of the RGB data signal which will be suitable for projection on the monitor (block 204). Once the image has been displayed on the monitor, interface decisions are made (decision block 204).

Although typically performed after other interface decisions have been executed, the unsharp masking method and apparatus of the present invention will initially be disclosed (block 206). In the art, unsharp masking is utilized to restore the sharpness of the image which is otherwise lost in the reproduction process. A suitable communication window for the unsharp masking method of the present invention is disclosed in relation to FIG. 6. The method itself is disclosed in relation to FIG. 7.

Figure 6:
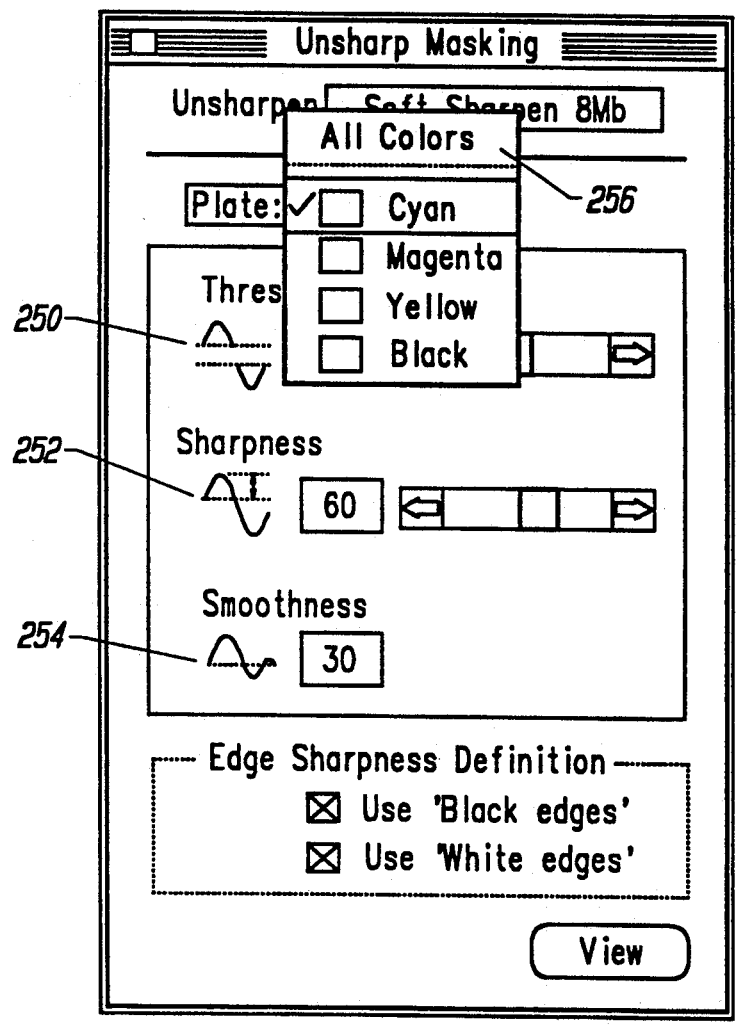
FIG. 6 depicts a suitable interface for an unsharp masking feature in accordance with the present invention.

Once the unsharp masking method is invoked, a number of decisions must be made. Turning to FIG. 6, prior art software techniques may be employed to generate three sliders to control the unsharp masking operations. The threshold slider 250 is utilized in deciding which edges will be sharpened, while the sharpness slider 252 enables control of the amount of sharpness to be applied to the edges selected by the threshold setting. The smoothness slider 254 only affects those areas that don't qualify for sharpening, which means that grainy images may be smoothed without losing the sharpness of the edges. Preferably, a color popup allows one to set the sliders for all colors simultaneously, or to adjust each color plate individually by a different amount.

Figures 7, 7A:
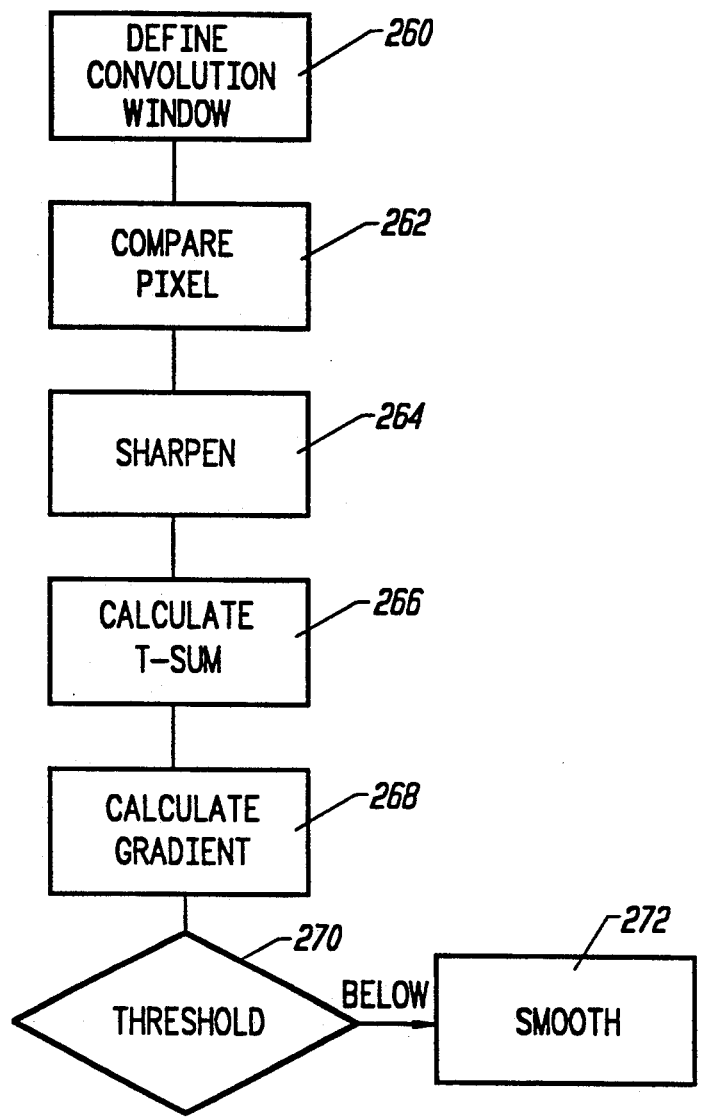
FIG. 7 is flow chart describing the unsharp masking operation in accordance with the present invention.
FIG. 7A is a sample convolution window suitable for use with the method disclosed in FIG. 7.

Turning to FIG. 7, the method of unsharp masking in accordance with the present invention is disclosed. Preferably, the unsharp masking is applied to full resolution data. Thus, in relation to the interface decisions of FIG. 5, unsharp masking alone is performed on a patch of the image which is at full resolution, not the subsampled image.

The following steps are performed in relation to CPU 50 and computer memory 52. Initially, a convolution window size is defined (block 260). By way of example, a 3×3 window is disclosed in FIG. 7A. A sum-pixel comparison is then made such that the current pixel, say, for instance, B2, is compared to the total sum of pixels in the window (block 262) to establish a value delta. Mathematically:

$$Sum = A1 + A2 + A3 + B1 + B2 + B3 + C1 + C2 + C3$$

then, $$Delta = B2 \times (window\ size) - Sum$$

In this example, the window size is 9 (3×3 matrix).

Using the sharpness factor (252, FIG. 6) as defined in the interface, a Laplacian filter is applied to obtain a sharpened pixel, B2' (block 264). A Laplacian filter is a configuration of constants which can be applied to a convolution matrix to give an effect which qualifies as sharpening. Such filters are known in the art. A Laplacian filter effect is achieved through the following equation:

$$Sharpened\ Pixel = Delta \times Sharpness\ Factor + B2$$

The resultant pixel B2' is a sharpened version of B2. All pixels in the defined image area are sharpened. With all pixels in the image area sharpened, a correcting smoothing is applied to the image in all areas which are not defined as an edge. The edge detection and smoothing are accomplished as follows.

A series of "T-sums" are calculated against the current pixel (block 266). Preferably, four calculations are made, using a 3×3 matrix as an example, the four "T-sums" calculated would be:

$$Tsum1 = ((A1+A2+A3)/3) - ((A2+B2+C2)/3)$$

$$Tsum2 = ((A1+B1+C1)/3) - ((B1+B2+B3)/3)$$

$$Tsum3 = ((C1+C2+C3)/3) - ((C2+B2+A2)/3)$$

$$Tsum4 = ((A3+B3+C3)/3) - ((B3+B2+B1)/3)$$

These T-sum values are then averaged:

$$Tsum_{avg} = (Tsum1 + Tsum2 + Tsum3 + Tsum4)/4$$

These values are compared to a calculated gradient value (block 268). Specifically, a horizontal gradient and a vertical gradient are calculated in the following manner.

$$Hgrad = (A1+A2+A3) - (C1+C2+C3)$$

$$Vgrad = (A1+B1+C1) - (A3+B3+C3)$$

The gradient is then defined as:

$$Gradient = Hgrad + Vgrad$$

If the gradient and $Tsums_{avg}$ are both smaller than the threshold set by the user (threshold set in interface slide bar 252, FIG. 6), then smoothing takes place (decision block 270).

Smoothing may be accomplished through the following equation which defines a Smoothval for each pixel.

$$Smoothval = (Sum/window\ size) \times Smoothness\ Factor$$

The smoothness factor is set by the user (interface slide bar 254 in the user interface of FIG. 6).

Thus, the present invention provides anunsharp masking approach in which the entire defined area is first sharpened. Next, the image is analyzed, in accordance with the invention, to determine whether individual pixels represent an edge. Edges are left alone, while non-edges are smoothed in accordance with the invention.

Preferably, an option is provided for tone/cast adjustments (block 208, FIG. 5). Tone/cast adjustments are widely known in the art. Yule, Principles of Color Reproduction, (John Wiley and Sons), provides a thorough treatment of the subject. A suitable dialogue is shown in reference to FIG. 8. The Tone and Cast control window 300 serves several purposes. Control of both functions is achieved with the three arrow controls 302, 304, and 306 which are centered on specific control points on the curve. This control window also allows access to the Limits control 308, which is simply a clamp on the two ends of the curve to force dots in or out of the end points.

The tone curves are adjusted by means of the three arrow controls 302, 304, and 306 at the base of the graph, which control three points along the curve that are roughly regarded as the quarter points of the curve—highlight quarter, midtone quarter, and shadow quarter points. Prior art computer control methods may be employed to move the graph up or down in the direction chosen.

Preferably, as one quarter point is adjusted, the other numbers will also move in relation to the graph, always producing a smooth curve. A smooth curve is critical in obtaining proper tone compression of an image without introducing strong and unnatural tone shifts.

Figure 8:
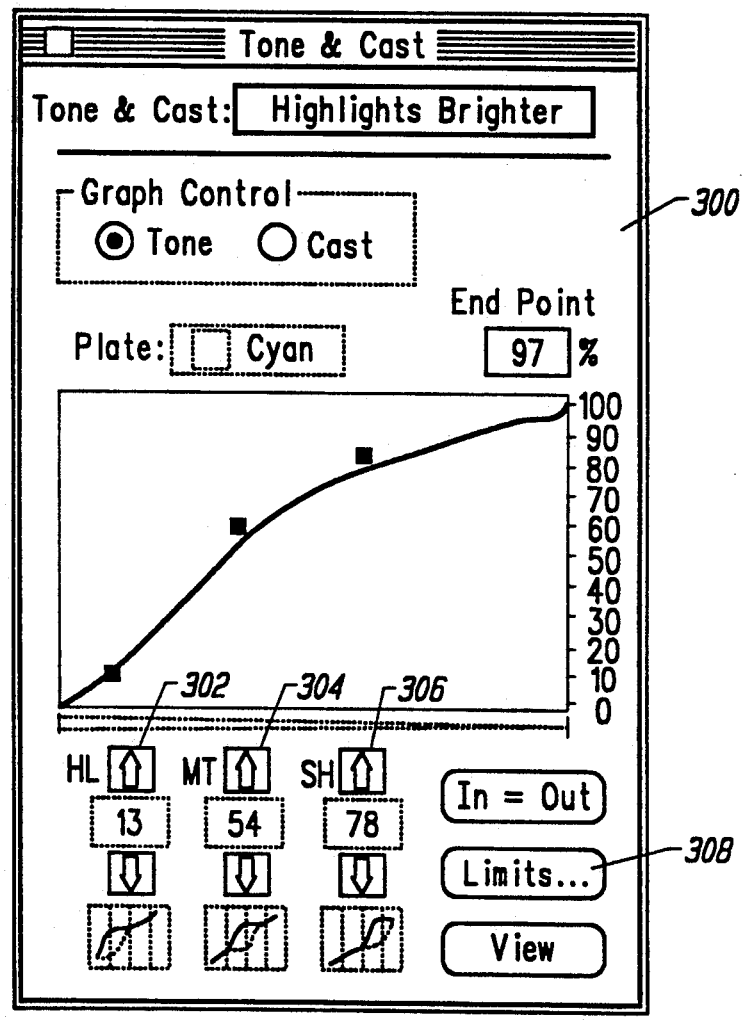
FIG. 8 depicts a suitable interface for a tone and cast feature in accordance with the present invention.

Preferably, cast control may also be invoked through the same interface of FIG. 8. Preferably, each color may be independently adjusted by means of the same three quarter controls. The results of the tone and cast controls are converted into look-up tables and stored.

Figure 9:
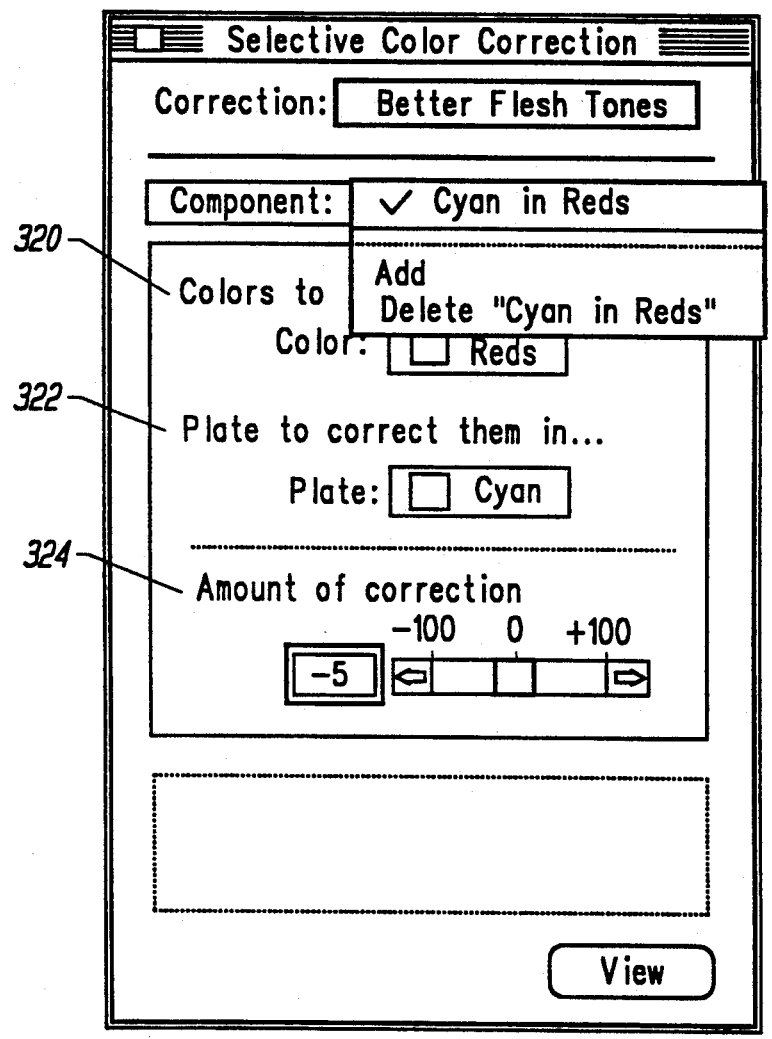
FIG. 9 depicts a suitable interface for a selective color correction feature in accordance with the present invention.

Preferably, colors may be selectively corrected (block 210). A typical selective color correction dialogue is disclosed in FIG. 9. Selective color correction, a technique known in the art, is an effective tool for correcting specific colors in the image without affecting other colors.

Preferably, one may choose the colors which will be affected 320, the plate on which the color will be corrected 322, and the amount of correction 324. You will notice that in the figure, "cyan in reds" is the selected item in the component popup and while this is selected, it can be deleted or changed.

Preferably, the colors that can be changed are classified into six bands: greens, yellows, reds, magentas, blues and cyans. This division of the color wheel, known in the art.

If selective color correction is required in the picture, it might be necessary to alter more than one color band, or to alter two different colors in one color band. For example, when the amount of magenta in reds is being reduced, the amount of the reduction is proportional to the strength of the red. Preferably, the selective color feature (210) finds every place in the picture that would be regarded as some form of red, grades it to see how strong a red it really is and then reduces the amount of magenta on the magenta plate at the specific point in the image, by the amount specified.

Figure 10:
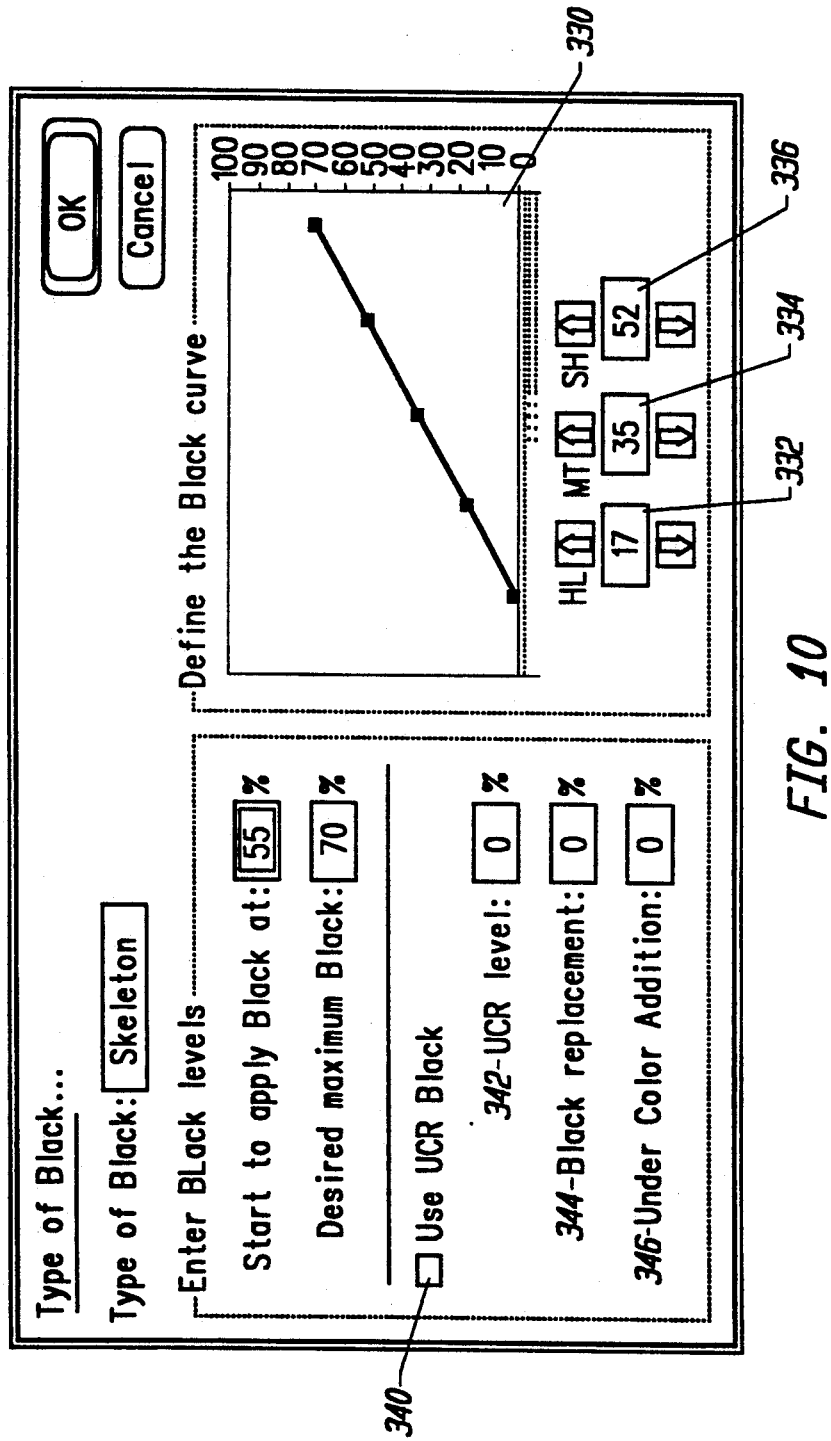
FIG. 10 depicts a suitable interface for a black generation feature in accordance with the present invention.

Preferably black generation is available (block 212). Prior art systems generally provide an option for skeleton black or under color removal. In accordance with the present invention, either option may be selected. FIG. 10 indicates a suitable communication window.

Black generation is used because of the failure of the CMY colors to produce black. It is also used to add detail and contrast in shadow areas by adding the density that is lost due to additivity failure when the inks are printed on top of each other. The most commonly used black, a four-color black, or skeleton black, generally does not generate any dots until well up the scale, as seen in FIG. 10. Typical values are a starting value of between 20% and 50% and a maximum dot of 80% in the shadows, although printing conditions and the job itself may call for changes in these values.

The most critical decisions in setting up a black are where the black is to come in or at what point along the gray scale the colors need reinforcing, and whether a full scale black called a full range black should be used. Once these decisions are made, a decision may be made in regard to the actual shape of the black tone curve 330.

Once these values are set, the curve can be adjusted. Pulling the curve 330 down will pull black out of the quarter to midtones and provide the shadow regions with more contrast by increasing the slope of the black tone curve 330. A good starting point is to leave the curve straight and either add or subtract from the three control points 332, 334, and 336 if more or less black is required in the image.

Undercolor removal may also be selected by clicking on the UCR option in FIG. 10. Preferably, a selection of three extra values in addition to the standard values used for skeleton black are provided. They represent the amount of color removal 342, how much black will replace the removed color 344, and whether any color addition is necessary 346.

As is known it the art, it is unwise to go beyond about 60% under color removal and an equivalent amount of black replacement should not go much below 70-80%. It is also wise to increase the range of the black plate itself from about 20% to about 100%.

Figure 11:
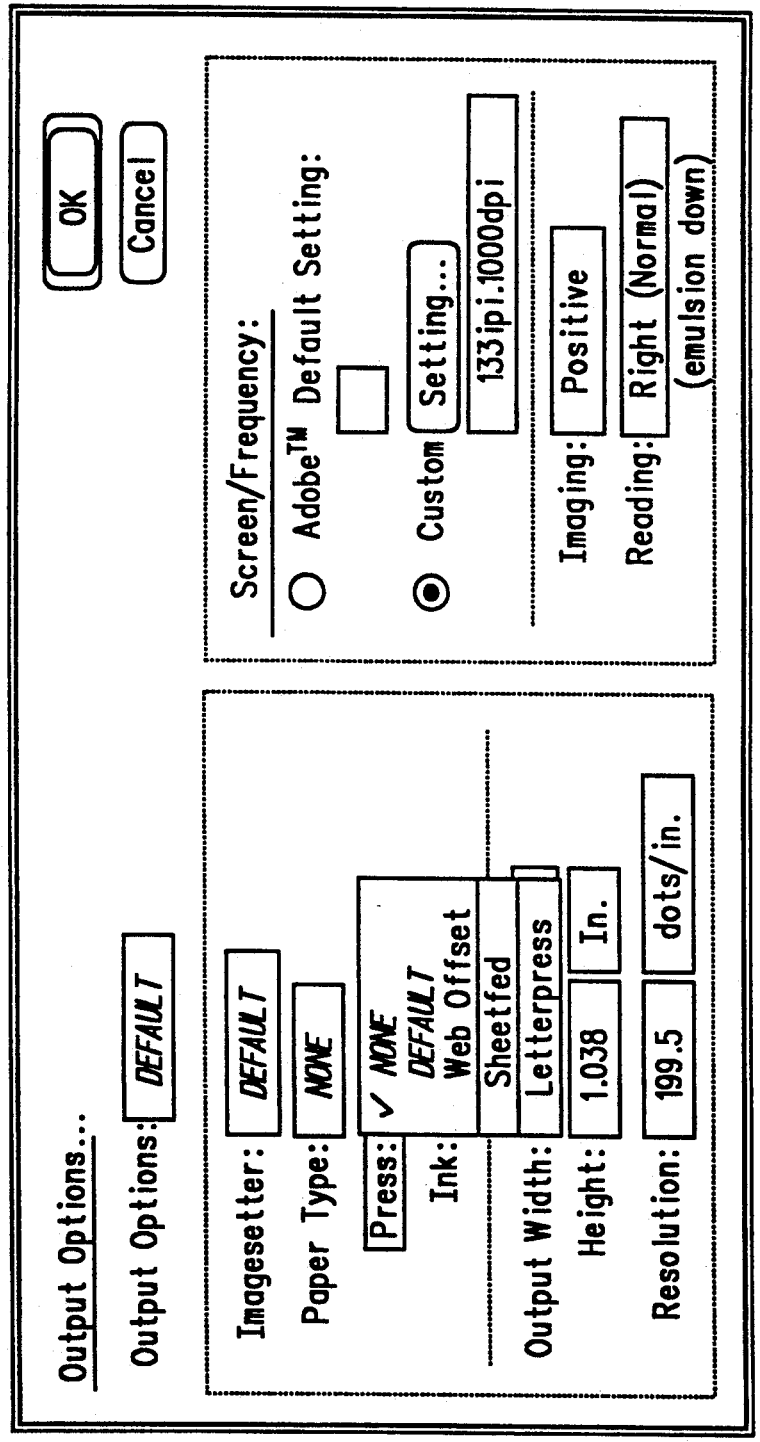
FIG. 11 depicts a suitable interface for an output option feature in accordance with the present invention.

Preferably, an output setting option is also provided (block 214). A suitable output setting dialogue is disclosed in relation to FIG. 11. This preferable output options dialogue box allows one to select data options commonly utilized in the art.

Another option which the user may select relates to ink values (block 216). Preferably, known ink errors may be entered for use during color separation, as to be more fully described below. For instance, a typical empirically defined, ink error would relate how much yellow and magenta are present in cyan ink. Preferably, an ink default value may also be entered to ensure that neutral colors are adjusted, during color separation, such that ink impurities do not add color bias to grays. A total ink parameter is also preferably provided to set a maximum ink value. If the maximum ink value requested at separation is exceeded, the values of CMY will be reduced and replaced with extra black values.

Preferably, a limits option (block 218) is also provided. The limits option will clamp minimum or maximum pixel color values at separation time. In other words, a maximum color value may be selected, any value above that maximum will be set to the maximum at the time of color separation.

After selections are made, settings are built (block 221), in accordance with known programming techniques, to realize the corrections. The chosen corrections will eventually be performed sequentially at separation time. The time it takes to separate an image depends on the number of selective corrections made. Before separation time, the subsampled data is modified in accordance with the entered settings (block 222).

Preferably, the subsampled image on the screen may be analyzed in relation to an online densitometer (block 224) which provides updated information relating to the converted image. Even with a calibrated monitor, the image preview is still only a simulation of what the image will look like when printed as four process colored inks on paper. The reason for this is that color separations and color printing uses a subtractive color model with corrections that take into account color impurities of inks, and the screen image is built from pure red, green, and blue colors using an additive color model. It is not possible on an additive color device to accurately represent the effect that corrections will have on a subtractive image. The densitometer provides information as to the actual corrections to the subtractive image. That is, the densitometer measures various color patches of a given area. The measuring head of the scanning densitometer moves from patch to patch to take measurements.

Figure 12:
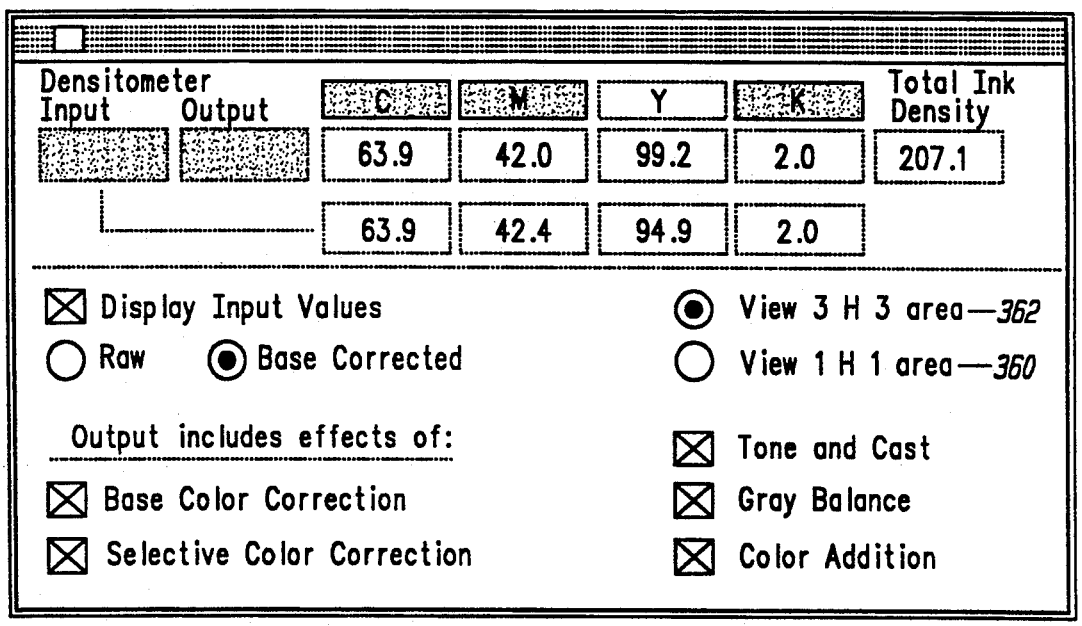
FIG. 12 depicts a suitable interface for a densitometer to be utilized in accordance with the present invention.

A suitable densitometer, to be used in accordance with the invention, is displayed in FIG. 12. The densitometer displays color data that has been calculated in exactly the same manner as it will be when the actual separations are processed. Such densitometers are known in the art.

Preferably, the densitometer has various modes of operation. The densitometer reads out the values as they will be in the separation wherever the mouse 28 is positioned over the image or preview windows. Preferably, there are two pixel readout modes, reading one pixel under the cursor 360, or averaging a 3×3 block of pixels 362. The densitometer provides ink density readings for each of the CMYK color planes.

After testing with the densitometer, the user may elect to return to a screen preview and affect additional changes. This process is repeated at the user's discretion. The user may also select to separate the RGB data into CMYK data (block 220). Selection of this feature invokes the separation engine (block 226).

Figure 13:
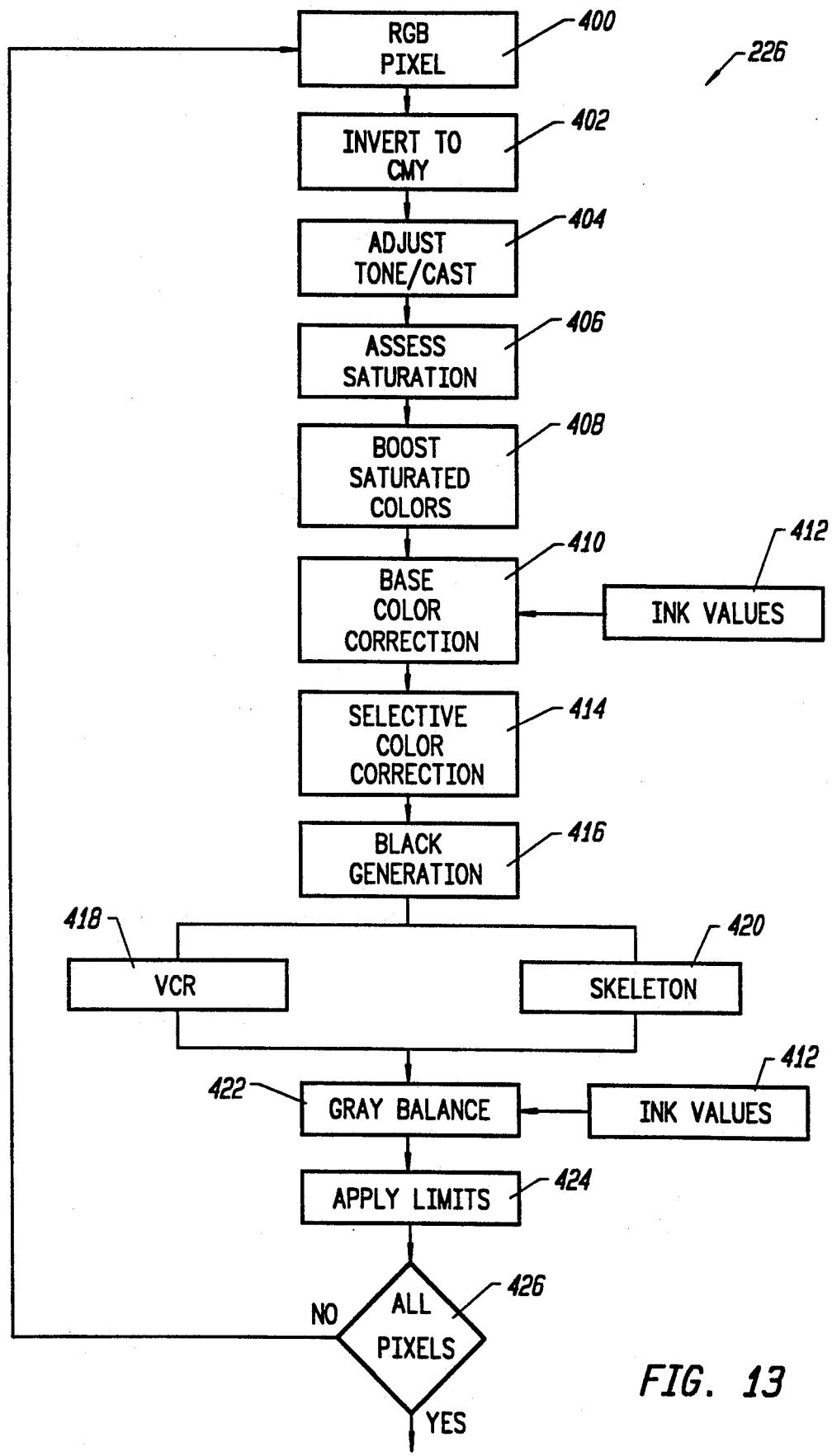
FIG. 13 is a flow chart of a separation engine in accordance with the present invention.

The separation engine is disclosed in reference to FIG. 13. Each RGB pixel (block 400) of the scanned image is fed into the separation engine 226. The separation engine initially converts the RGB data to CMY data (block 402). This conversion is readily accomplished since each RGB value is the opposite of its corresponding CMY value. For instance, assuming that each color is defined by an 8 bit value, then C=255 −R, where R is some value for red between 0 and 255. Similarly, this reasoning would indicate that: M=255 −G and Y=255 −B. Preferably, a hashing scheme is used to reduce the number of calculations for inverting to CMY.

After this inversion, each pixel value is adjusted to fit the tone and cast curves previously built (see discussion in reference to block 208, FIG. 5). Specifically, an input value for the look-up table is matched for the input and the accompanying output value in the look-up table is assigned as the output value.

Next, saturation is assessed (block 406). Saturation levels may be defined by the user to suit individual needs. Such techniques are known in the art. One way of checking the saturation level is to take the difference between individual CMY values, for instance, let A=C−Y, B=C−M, and C=Y−M. The A, B, and C values may then be compared to determine the maximum value. That maximum value may then be compared to determine whether it is above some empirical number defining saturation. The empirical number will thereby define the minimum threshold for saturation. The empirical saturation values are known in color theory.

Saturation may be modified in relation to the boost saturation step (block 408). Depending on the measured saturation, a color is boosted further, presuming that certain scanners cannot produce an appropriate saturation in bright colors. For example, a saturated color that measures 95% saturation would probably be pushed to 100% saturation. The scanner is measured for its ability to saturate bright colors, as is known in the art, and any deficiency in the scanner is allowed for by boosting colors at this step.

Base color correction (block 410) is then applied to the pixel. This correction is largely determined by the ink error (block 412); the ink errors have been previously described. Ink errors are measured, for instance, in terms of how much yellow and magenta are present in cyan ink. This information is commonly available in the literature. Once this data is known, each pixel is adjusted to allow for the impurities.

Selective color correction is then utilized (block 414). This data having been previously accumulated and discussed (block 210, FIG. 5).

Subsequently, black is generated (block 416). In accordance with the invention, a choice of undercolor removal (block 418) or skeleton black (block 420) may be selected, as previously discussed.

Gray balance (block 422) is then applied. Specifically, after assessing the grayness of a pixel's color, the pixel is pushed further towards true gray, if desired. This technique is known in the art. The gray balance determination is also affected by ink value information (block 412). Specifically, the neutral colors are adjusted to ensure that ink impurities do not add color bias to grays.

After the gray balance adjustments, preferably, limits are applied (block 424). Limits were set in the user interface (block 218, FIG. 5). An additional adjustment based upon total ink value may be made at this point. Specifically, if the maximum ink value requested for each pixel is exceeded, the values of CMY may be reduced and replaced with extra black values.

After the separations have taken place, unsharp masking of the CMYK signals is undertaken (block 228). The unsharp masking previously applied (block 206, FIG. 5) was merely applied to patches of the image, as defined by the user. At this point, unsharp masking is applied to each of the CMYK color planes. Pixels near the extremes of the tonal range may be ramped off to zero.

Afterwards, headers are added to each CMYK color signal (block 230). Preferably, Postscript headers are added to the resultant files, in accordance with the prior art. The resultant files are then stored in memory (block 232).

From memory, the files may be transferred for further data processing, for instance the files may be exported to a page layout program such as XPress, a product of Quark, Inc., or DesignStudio, a trademark of Letraset, Inc. After combining images with text, the resultant file may be sent to an imagesetter for production of film for printing plates.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A printing apparatus comprising:
an optical assembly for receiving an image from film;

a filter assembly coupled to said optical assembly for generating red, green, and blue analog image signals corresponding to said image of said film;

an electronic processor for receiving said red, green and blue analog image signals and producing corresponding red, green, and blue digital image signals;

interface means for receiving and storing user defined values, said interface means receiving and storing a printing density value, a target highlight dot percentage value, a target shadow dot percentage value, highlight density information, and shadow density information;

means, coupled to said interface means, for calculating tone curve data from said printing density value, said target highlight dot percentage value, said target shadow dot percentage value, said density information, and said shadow density information;

means, could to said electronic processor, for tonally compressing said red, green, and blue digital image signals in accordance with said tone curve data to yield red, green, and blue tonally compressed digital image signals; and means for converting said red, green, and blue tonally compressed digital image signals into corresponding cyan, magenta, yellow, and black digital signals.

2. The apparatus of claim 1 further comprising:

means for filtering said cyan, magenta, yellow, and black digital signals, said cyan, magenta, yellow, and black digital signals each comprising a plurality of individual pixels, said filtering means further including
  means for establishing a selected pixel from said plurality of individual pixels,
  means for defining a pixel matrix, said pixel matrix including a plurality of said individual pixels surrounding said selected pixel,
  means for sharpening said selected pixel according to a sharpness factor derived from said pixels within said pixel matrix,
  means for calculating a T-sum within said pixel matrix,
  means for calculating a gradient within said pixel matrix,
  means for comparing said T-sum and said gradient to a threshold, and
  means for smoothing said selected pixel in response to said comparing means.

3. The printing apparatus of claim 1 further comprising means for adjusting the tone and the cast of said cyan, magenta, yellow, and black digital signals, said means including a dialogue window displayed on a monitor of said interface means, said dialogue window portraying a first curve which may be adjusted at a plurality of points to adjust said tone of one of said cyan, magenta, yellow, or black digital signals, said dialogue window alternately portraying a second curve which may be adjusted at a plurality of points to adjust said cast of one of said cyan, magenta, yellow, or black digital signals.

4. The printing apparatus of claim 1 further comprising means for selectively adjusting color, said means including a dialogue window displayed on a monitor of said interface means, said window portraying a color to be corrected, a corresponding plate to correct the color, and a user defined amount of color correction.

5. The printing apparatus of claim 1 further comprising means for selecting between skeleton black or under color removal, said means including a dialogue window displayed on a monitor of said interface means, said window portraying a black curve, a plurality of points for adjusting said black curve, and an undercolor removal percentage level.

6. The printing apparatus of claim 1 further comprising a densitometer, said densitometer including a dialogue window displayed on a monitor of said interface means, said window portraying the printing densities corresponding to said cyan, magenta, yellow, and black digital signals.

7. A printing apparatus comprising:

an optical assembly for receiving an image from film;

a filter assembly coupled to said optical assembly for generating red, green, and blue analog image signals corresponding to said image of said film;

a first electronic processor for receiving said red, green, and blue analog image signals and producing corresponding red, green, and blue digital image signals;

means for converting said red, green, and blue digital image signals into corresponding cyan, magenta, yellow, and black digital signals; and means for processing said cyan, magenta, yellow, and black digital signals, said cyan, magenta, yellow, and black digital signals each comprising a plurality of individual pixels, said processing means including
  means for establishing a selected pixel from said plurality of individual pixels,
  means for defining a pixel matrix, said pixel matrix including a plurality of said individual pixels surrounding said selected pixel,
  means for sharpening said selected pixel according to a sharpness factor derived from said pixels within said pixel matrix,
  means for calculating a T-sum within said pixel matrix,
  means for calculating a gradient within said pixel matrix,
  means for comparing said T-sum and said gradient to a threshold, and
  means for smoothing said selected pixel in response to said comparing means.

8. The printing apparatus of claim 7 wherein said converting means comprises:

interface means for receiving and storing user defined values, said interface means receiving and storing a printing density value, a target highlight dot percentage value, a target shadow dot percentage value, highlight density information, and shadow density information;

means, coupled to said interface means, for calculating tone curve data from said printing density value, said target highlight dot percentage value, said target shadow dot percentage value, said density information, and said shadow density information; and means, coupled to said electronic processor, for tonally compressing said red, green, and blue digital image signals in accordance with said tone curve data to yield red, green, and blue tonally compressed digital image data.

9. The printing apparatus of claim 8 further comprising means for adjusting the tone and the cast of said cyan, magenta, yellow, and black digital signals, said means including a dialogue window displayed on a monitor of said interface means, said dialogue window portraying a first curve which may be adjusted at a plurality of points to adjust said tone of one of said cyan, magenta, yellow, or black digital signals, said dialogue window alternately portraying a second curve which may be adjusted at a plurality of points to adjust said cast of one of said cyan, magenta, yellow, or black digital signals.

10. The printing apparatus of claim 8 further comprising means for selectively adjusting color, said means including a dialogue window displayed on a monitor of said interface means, said window portraying a color to be corrected, a corresponding plate to correct the color, and a user defined amount of color correction.

11. The printing apparatus of claim 8 further comprising means for selecting between skeleton black or under color removal, said means including a dialogue window displayed on a monitor of said interface means, said window portraying a black curve, a plurality of points for adjusting said black curve, and an undercolor removal percentage level.

12. The printing apparats of claim 8 further comprising a densitometer, said densitometer including a dialogue window displayed on a monitor of said interface means, said window portraying the printing densities corresponding to said cyan, magenta, yellow, and black digital signals.

13. A method of converting red, green, and blue analog image signals to corresponding red, green, and blue digital image signals with a tonal compression sufficient for printing, said method comprising the steps of:

receiving red, green, and blue analog image signals;
producing corresponding red, green, and blue digital image signals;
receiving and storing a printing density value, a target highlight dot percentage value, a target shadow dot percentage value, highlight density information, and shadow density information;
calculating tone curve data from said printing density value, said target highlight dot percentage value, said target shadow dot percentage value, said density information, and said shadow density information;
tonally compressing said red, green, and blue digital images in accordance with said tone curve data to yield red, green, and blue tonally compressed digital image signals; and
converting said red, green, and blue tonally compressed digital image signals into corresponding cyan, magenta, yellow, and black digital signals.

14. The method of claim 13 further comprising the steps of:

filtering said cyan, magenta, yellow, and black digital signals, said cyan, magenta, yellow, and black digital signals each comprising a plurality of individual pixels, said filtering step further including the steps of
establishing a selected pixel from said plurality of individual pixels,
defining a pixel matrix, said pixel matrix including a plurality of said individual pixels surrounding said selected pixel,
sharpening said selected pixel according to a sharpness factor derived from said pixels within said pixel matrix,
calculating a T-sum within said pixel matrix,
calculating a gradient within said pixel matrix,
comparing said T-sum and said gradient to a threshold, and
smoothing said selected pixel in response to said comparing step.

15. The method of claim 14 further comprising the steps of;
selecting black generation by skeleton black or under color removal.

* * * * *